United States Patent [19]

Eisenberg

[11] Patent Number: 4,874,994
[45] Date of Patent: Oct. 17, 1989

[54] CONTROL CIRCUIT FOR A CONTROLLER FOR USE WITH A CONTROLLED ELEMENT

[75] Inventor: Gerd Eisenberg, Rossdorf, Fed. Rep. of Germany

[73] Assignee: BTS Broadcast Television Systems GmbH, Darmstadt, Fed. Rep. of Germany

[21] Appl. No.: 194,811

[22] Filed: May 17, 1988

[30] Foreign Application Priority Data

Jun. 12, 1987 [DE] Fed. Rep. of Germany ....... 3719580

[51] Int. Cl.$^4$ .............................................. H02P 1/22
[52] U.S. Cl. .................................... 318/257; 318/280; 318/293; 318/558
[58] Field of Search ............... 318/257, 258, 280, 293, 318/558

[56] References Cited

U.S. PATENT DOCUMENTS

| | | | |
|---|---|---|---|
| 4,259,625 | 3/1981 | Hatakeyama et al. | 318/258 |
| 4,629,949 | 12/1986 | Senso | 318/257 |
| 4,658,192 | 4/1987 | Casteel et al. | 318/257 |

FOREIGN PATENT DOCUMENTS

| | | | |
|---|---|---|---|
| 0247760 | 7/1987 | German Democratic Rep. | 318/257 |
| 55-68891 | 5/1980 | Japan | 318/257 |
| 56-19389 | 2/1981 | Japan | 318/258 |
| 59-37891 | 3/1984 | Japan | 318/257 |

Primary Examiner—Bentsu Ro
Attorney, Agent, or Firm—Frishauf, Holtz, Goodman & Woodward

[57] ABSTRACT

To control a reversible element (E), such as a motor and especially a motor operating a tape recorder tape transport, actual operating level input signals in form of timed pulses, depending on speed, and operating sign input signals are applied to a controller (8) through a frequency measuring circuit (5). The controller (8) compares the command level input signal and the actual input signal and provides corresponding error or control output signals. In accordance with the invention, a switch or gate (6) is interposed between the actual operating level input and a frequency measuring circuit (5) which, in turn, controls the controller, the gate or switch being conductive if and only if the sign of the actual operating signal and the sign of the command signal agree, as determined by an antivalence or AND-function gate (7). Upon disagreement of the sign signals, the gate is opened. A transfer switch (10) controlled by the command sign input (3) selectively transfers the output from the controller (8) either directly or through an inverter (11) to the controlled element (E).

6 Claims, 1 Drawing Sheet

CONTROL CIRCUIT FOR A CONTROLLER FOR USE WITH A CONTROLLED ELEMENT

Reference to related application, by the inventor hereof, assigned to the assignee of the present invention, the disclosure of which is hereby incorporated by reference: U.S. Ser. Nos. 194,810, filed May 17, 1988, Eisenberg; 194,809, filed May 17, 1988, Eisenberg.

The present invention relates to a control circuit to provide a control signal output for control of a reversible controlled element, for example an electric motor, and especially a motor which is reversible, and which drives a magnetic tape transducing apparatus, e.g. a video tape recording apparatus.

BACKGROUND

Various types of motors have speed conrol systems coupled thereto in which the rotary speed of the motor is sensed by a transducer. The transducers provide signals representative of actual motor revolution, or motor speed, for comparison with command values in a closed control system. Such control systems provide signals which are representative not only of the deviation or error value, but also representative of the direction of operation of the motor. The operating direction of the motor can be represented by a signal which changes its sign, for example associates a 1-level value with one direction of rotation and a 0-level value with the opposite direction.

Speed transducers for use with rotary equipment may be opto-electrical or magnetic pulse transducers which, for each revolution of the motor, provide a predetermined number of pulses. The frequency of occurrence of the pulses is a measure of the speed. This signal, however, has no information regarding the direction of rotation, that is, the sign which the speed signal should have. Many drives are controlled in such a manner that the direction is also important, so that information regarding the sign is required.

Information regarding the direction of rotation may be obtained by providing two pulse transducers which are angularly offset with respect to each other, so that the phase relationship of the signals derived from the respective transducer can be analyzed and, then, the direction of rotation determined.

THE INVENTION

It is an object to provide a circuit arrangement with a controller in which signals representative, separately, of speed information and direction-of-rotation, or sign information can be simply and easily processed.

Briefly, a controlled gate circuit is provided, interposed between an actual operating level input and a measuring circuit. A sign input signal and a command sign input control the operation of a gate circuit, such as two-input antivalence circuit, in such a manner that the gate circuit is controlled to be conductive only if the signs of the input signals—that is, actual and command—agree. An inverting circuit is connected between the controller and the signal output, the inverting circuit being controlled for selectively inverting the signal output under control of the command sign input independently of the value of the signal which is derived from the controller.

The circuit has the advantage that it is simple and easily permits correct analyis of signals with respect to four quadrants of a command signal and provide an appropriate output signal.

The system is particularly applicable to control the speed of operation of a magnetic tape drive motor of a video tape recording apparatus. The four quadrants above referred to may be considered as increasing positive, decreasing positive, more negative, or less negative.

DRAWINGS, SHOWING ILLUSTRATIVE EMBODIMENTS

FIG. 1 is a highly schematic block circuit diagram of an embodiment of the present invention, in which all parts not necessary for an understanding of the invention have been omitted; and FIG. 2 illustrates the relationship of the actual value signal applied to the control circuit with respect to cycling duration of the actual level signal applied to the controller.

DETAILED DESCRIPTION

Figure 1:
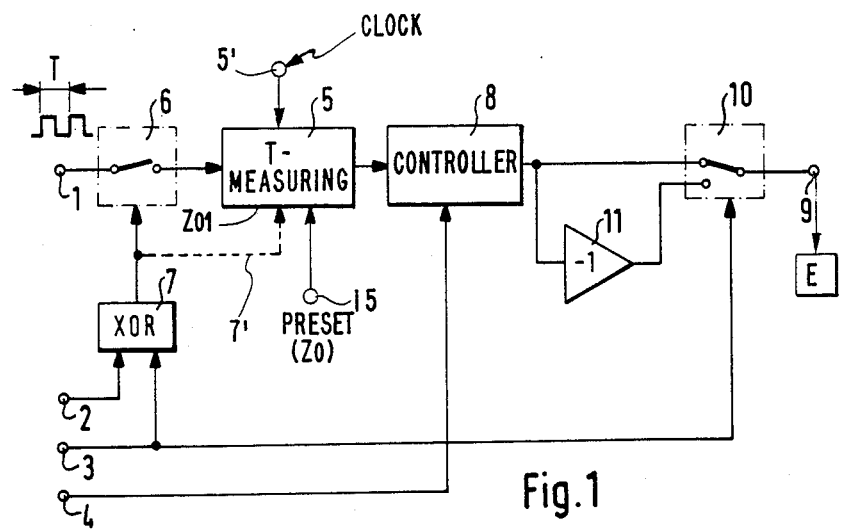

The circuit has a first input 1 which receives pulse-type signals, having a cycling duration T which is inversely proportional to speed of a motor, not shown, and incorporated for example in an equipment generally shown at E, for instance a magnetic tape recording apparatus. A sign signal, the value of which depends on direction of rotation, is applied to terminal 2. This sign signal, which is an actual sign signal, may have either one of two voltage values.

Two further input terminals are provided, in which terminal 3 provides the sign of a command signal, likewise present as a binary signal, and terminal 4 is a command level value signal input terminal. The command value signal is not of substantial importance in discussing the present invention and, therefore, for simplicity, the actual value signal which is applied to the input signal 1 will also be referred to as "value" or "level" signal.

Input 1 has the level value signal applied thereto, which level value signal is connected to a frequency measuring circuit 5, which measures the cycling duration of the input pulses applied to terminal 1. The frequency measuring circuit 5 provides a value of the cycling time T in the form of a digital signal which is applied to the controller 8. The controller 8 then generates, based on this digital value, a positioning level signal which is applied to the terminal 9 for connection to the equipment E, for example a motor.

In accordance with the present invention, a switch in the form of a gate circuit 6 is interposed between the terminal 1 and the cycling time or frequency measuring circuit 5. The gate 6 is controlled by an antivalence circuit 7 which, essentially, functions like a coincidence or AND-function gate, in such a manner that the switch or gate 6 will become nonconductive if the signs of the signals applied to circuit 7 do not concur.

In accordance with a feature of the invention, a transfer switch 10 is provided between the controller 8 and the output terminal 9 so that the output terminal 9 can be, selectively, connected directly to the controller 8 or receive the output from the controller 8 through an inverter 11. The control input of the transfer switch 10 is connected to the input terminal 3 which provides the command sign input, so that, therefore, the operation of the switch 10 is controlled in accordance with the sign of the command value or, in other words, the command sign.

OPERATION

Let it first be assumed that the system operates normally. In that case, the signals at terminals 2 and 3 characterizing actual and commanded direction, that is their signs are identical. The gate circuit is conductive, and the transfer switch 10 is in the position shown in FIG. 1, that is, a direct connection exists between the controller 8 and the output terminal 9. Let it be assumed that, then, the actual value signal applied to terminal 1 increases above the command value. This, then, is determined in the controller 8 which received the command signal from terminal 4. The output signal at terminal 9 is modified accordingly.

Let it be assumed, next, that upon change of the command signal, for example by an operator changing or rotating a control knob, the sign of the command value is to be changed—in other words, the motor in the equipment E is to change its direction of rotation. In an ordinary controller, and without taking special precautions, instabilities would arise if the controller can only handle the actual value signals.

In accordance with the present invention, however, the motor which will continue to operate in the previous direction will generate a sign signal representative of this direction at terminal 2. The sign signal at terminal 3, however, will be different so that, due to the difference of the signs applied to the circuit 7, the gate 6 will be controlled to become nonconductive, so that the controller 8 will not receive any level input signal from terminal 1 at all. Stoppage of the motor 5 is thus simulated to the controller 8. Comparing the simulated "stopped" signal applied to the controller 8 with the command signal applied from terminal 4 thus will result in a positioning signal at terminal 9 which causes change in speed. The sign of this positioning signal is corrected by change-over of the transfer switch 10 to apply it in inverse sign through the inverter 11.

The motor, then, will receive a high level signal in the direction opposite its prior direction. This causes the motor to decelerate until it is actually stopped, and then start to rotate in the opposite direction. At that instant, however, the actual sign signal at terminal 2 will also change, so that the circuit 7 now will again have signals of equal sign applied thereto, causing the gate circuit 6 to become conductive. At that time, the actual value signal is applied from terminal 1 to the controller so that the controller 8 can then control the speed of the motor in equipment E to the commanded value.

The less the speed of the motor, and hence the frequency of the actual value signal applied at terminal 1, the less often can measured values be applied from the measuring circuit 5 to the controller 8. This may result in undesirable and interfering dead times in the control system when the speed of operation is low. From stopped or very low speed operation, acceleration is thus obtainable only with difficulty.

To improve the low speed response, a predetermined or preset counting value is provided. This predetermined count value which is then transmitted to the controller 8 if, when this predetermined count has been reached, no new pulse representative of the actual value input signal from terminal 1 has been obtained. This minimum value then is determinative of the condition that the speed is equal to or less than a value which just can still be measured. The selection of the amount of this preset value, applied for example from terminal 15, must be based on a compromise which, on the one hand, requires rapid response of the controller and, on the other, precise control behavior also at low speed levels.

In accordance with the present invention, no pulses are applied to the controller 8 from the input 1 or the circuit 5 when the signs at terminals 2 and 3 differ. Thus, under those conditions, the controller 8 likewise will receive a predetermined count value applied thereto. To reduce the dead time of the controller also in this case, the count value preferably is so determined that its level is lower if the signs at terminals 2 and 3 are different. Concurrence or difference in sign is determined by the circuit 7. The lower count value can be applied either to the controller 8 or to the cycling measuring circuit 5. The broken line 7', connected between the output from the gate circuit 7 and the cycling measuring or frequency measuring circuit 5, provides this lower value preset signal.

Figure 2:
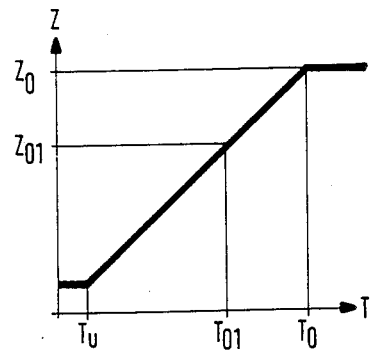

The relationship between the output number Z generated by the controller 8 and the cycling duration T of the level signal is graphically shown in FIG. 2. At the cycling duration $T_u$ the measuring range in decreasing direction is limited, that is, below the cycling duration $T_u$, the frequency of count pulses cannot be greater than that of the reference signal. In the upper range, the measuring region $T_O$ is limited since, after a predetermined time, the controller 8 requires an input signal so that it does not have an excessively long dead time period. Upon counting a period of time $T_O$, the count value $Z_O$ is provided which corresponds to a low rotary speed. This is obtained from terminal 15. If the signs are different, the output $Z_{o1}$ is emitted, when the cycling time $T_{o1}$ has been reached, for example upon energization of the line 7'.

Since the system, starting from unit 5, operates digitally, a clock input 5' is provided which, of course, can be suitably connected to all other components, as well known.

I claim:

1. A control circuit for providing a control signal output (9) to a reversible controlled element (E), comprising
    an actual operating level input (1) for receiving a variable repetition pulse signal;
    an actual operating sign output (2);
    a command sign input (3);
    a command level value input (4);
    a measuring circuit (5) receiving signals from said actual operating level input and said command level value input for providing a signal representative of the frequency of the actual operating level input; and
    a controller (8) connected to and controlled by said measuring circuit (5) for providing a control signal at said control signal output (9);
    said control circuit, in accordance with the invention further comprising:
    a controlled gate circuit (6) interposed between said actual operating level input (1) and said measuring circuit (5);
    a two-input antivalence circuit (7) forming a conjunctive or AND-function gate (7), connected to the actual operating sign input (2) for receiving a digital operating sign input signal, and also connected to the command sign input (3) for receiving a digital command sign input signal, said two-input antivalence circuit (7) providing an output signal to the gate circuit to control the gate circuit to be conductive if and only if the signs of the two input signals agree;

an inverting circuit (11) connected between the controller (8) and the control signal output (9) for providing an inverted control signal at said control signal output; and means (10) coupled to said controller and said inverting circuit for selecting one of said control signal and said inverted control signal under the control of the command sign input in dependence on the sign of the signal applied thereto.

2. The circuit of claim 1, wherein the means (10) coupled to said controller and said inverting circuit comprises a transfer switch (10) having one input terminal connected to said controller (8) and another input terminal connected through the inverting circuit (11) to the controller, said transfer switch having an output terminal connected to the control signal output (9);

and wherein said transfer switch is controlled in dependence on the sign of the command sign input.

3. The circuit of claim 1, wherein signals to the actual operating level input are formed by pulses, the pulse repetition rate of which being associated with an actual operating level of the controlled element (E); said circuit further comprising a clock (5') coupled to the measuring circuit to count the frequency by applying clock pulses to the actual operating level input in which the frequency of the clock pulses is high with respect to highest expected cycling rate of the actual operating level input signal; and means (7', 15) coupling a digital value to the controller (8) if the digital value, upon counting said clock pulses, occurs before a further pluse is received at the actual operating level input, so that the controller (8) will receive a minimum count value regardless of the sequence of pulses at the actual operating level input.

4. The circuit of claim 3, wherein a predetermined frequency having a predetermined count value is applied to the measuring circuit (5).

5. The circuit of claim 3, wherein a higher and a lower count values are applied to the controller;

and wherein, if the command sign input signals and the actual operating sign input signals differ, the lower count value is applied to the controller.

6. The circuit of claim 5, wherein said count value is applied to the measuring circuit (5).

* * * * *